United States Patent [19]

Trotter

[11] Patent Number: 5,278,591
[45] Date of Patent: Jan. 11, 1994

[54] EYEGLASS HOLDER CLIP AND ACCESSORY KIT

[76] Inventor: Francis M. Trotter, P.O. Box 7999, Alexandria, La. 71306

[21] Appl. No.: 874,440

[22] Filed: Apr. 27, 1992

[51] Int. Cl.$^5$ .............................................. G02C 5/14
[52] U.S. Cl. .................................... 351/112; 351/111; 351/158
[58] Field of Search .............. 351/111, 112, 158, 155; 24/3 C, 3 J

[56] References Cited

FOREIGN PATENT DOCUMENTS 1162365  4/1958  France ............................ 351/112

Primary Examiner—Bruce Y. Arnold
Assistant Examiner—Hung Xvan Dang
Attorney, Agent, or Firm—Leon Gilden

[57] ABSTRACT

An eyeglass framework has a respective first and second folding leg mounting at opposed ends thereof, with at least one leg having a clip member formed with a fixed jaw and movable jaw biased towards the fixed jaw to permit securement of the eyeglass assembly within a pocket structure in a secure relationship during transport and storage of the organization. The invention is further arranged to permit a plurality of tether lines arranged for securement thereto to permit remote mounting of the eyeglass structure. A further cable is arranged of a fiber optic cable construction in operative communication with an illumination member to direct illumination through the fiber optic cable to project illumination forwardly of the eyeglass framework.

3 Claims, 4 Drawing Sheets

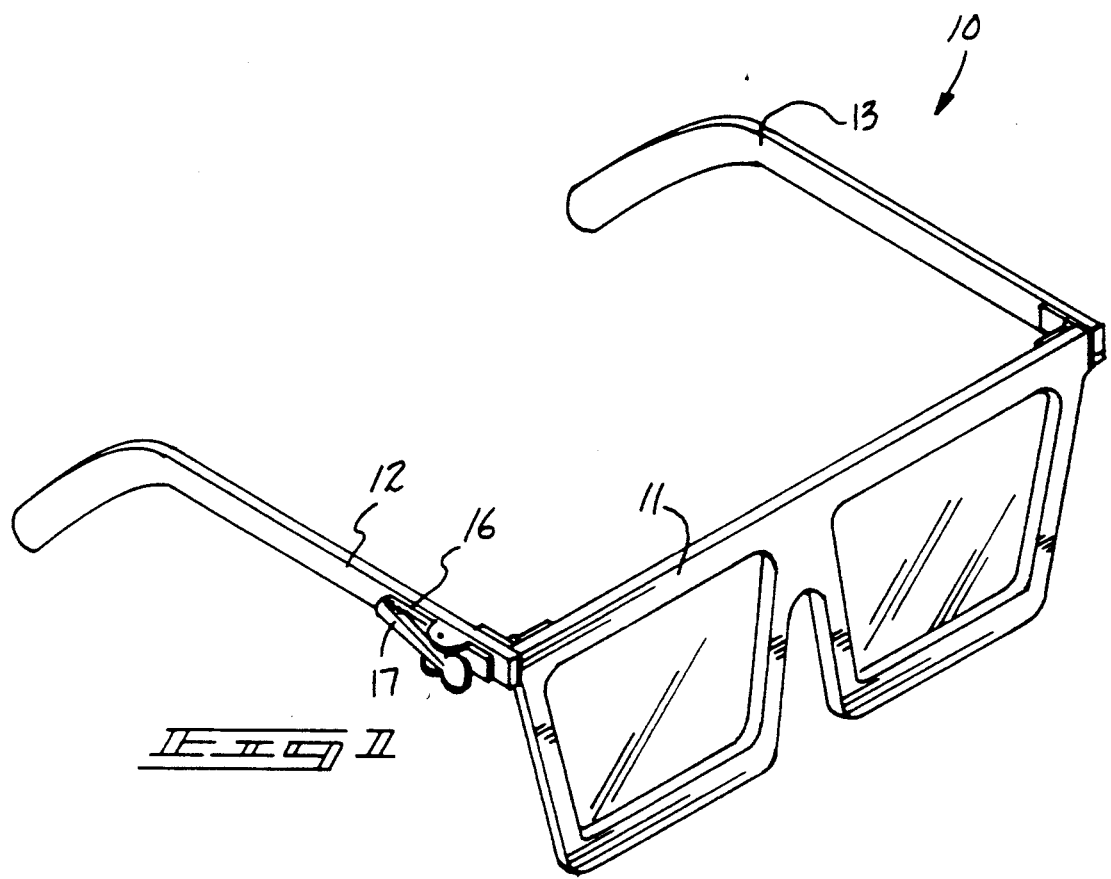
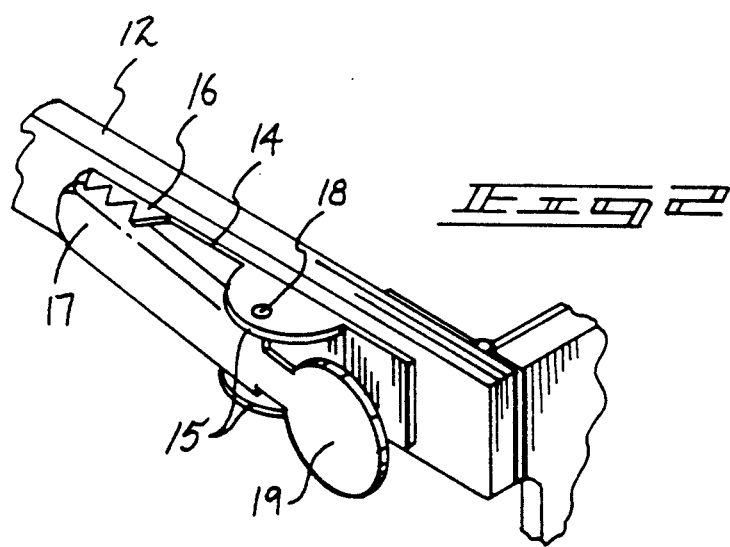

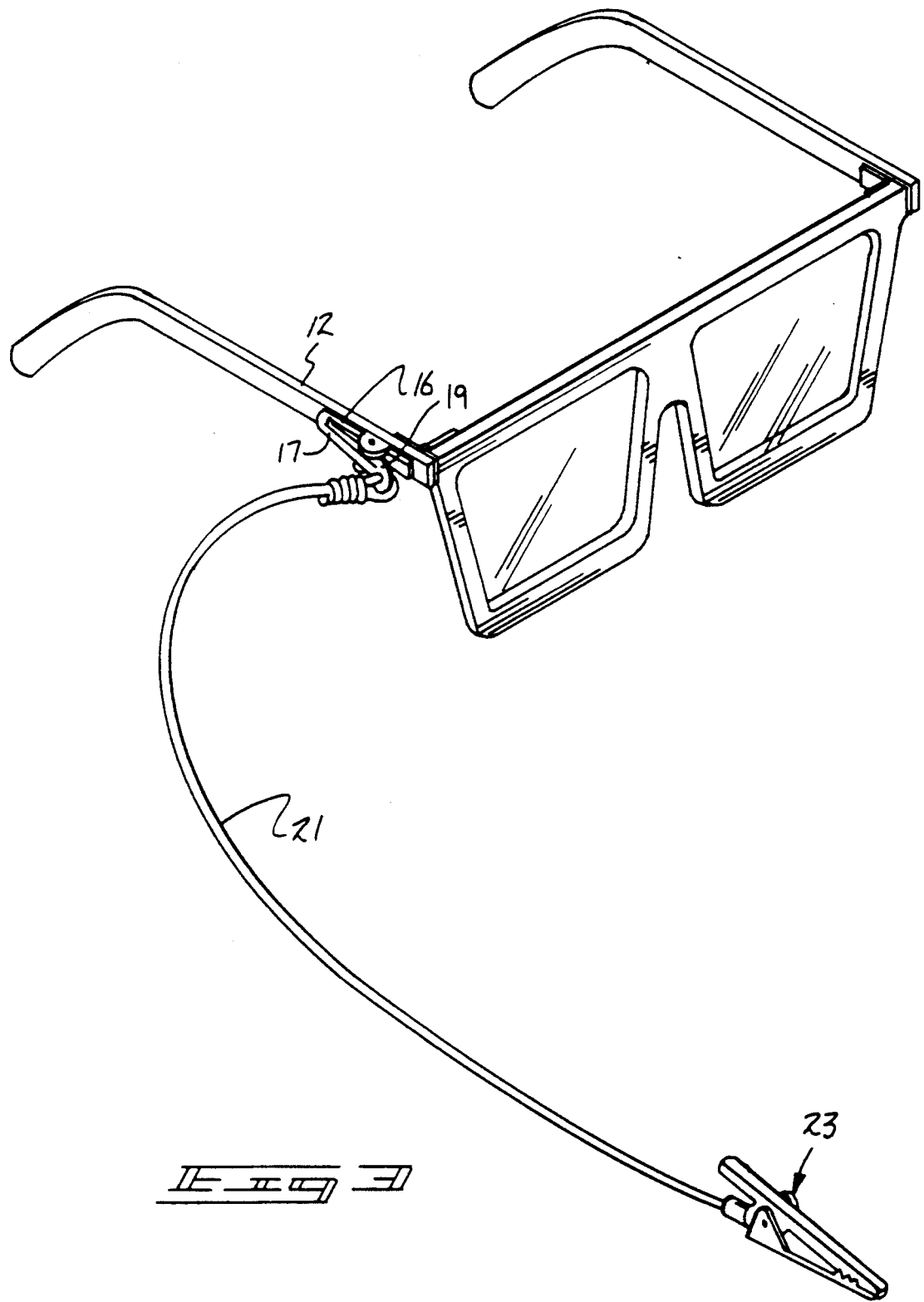

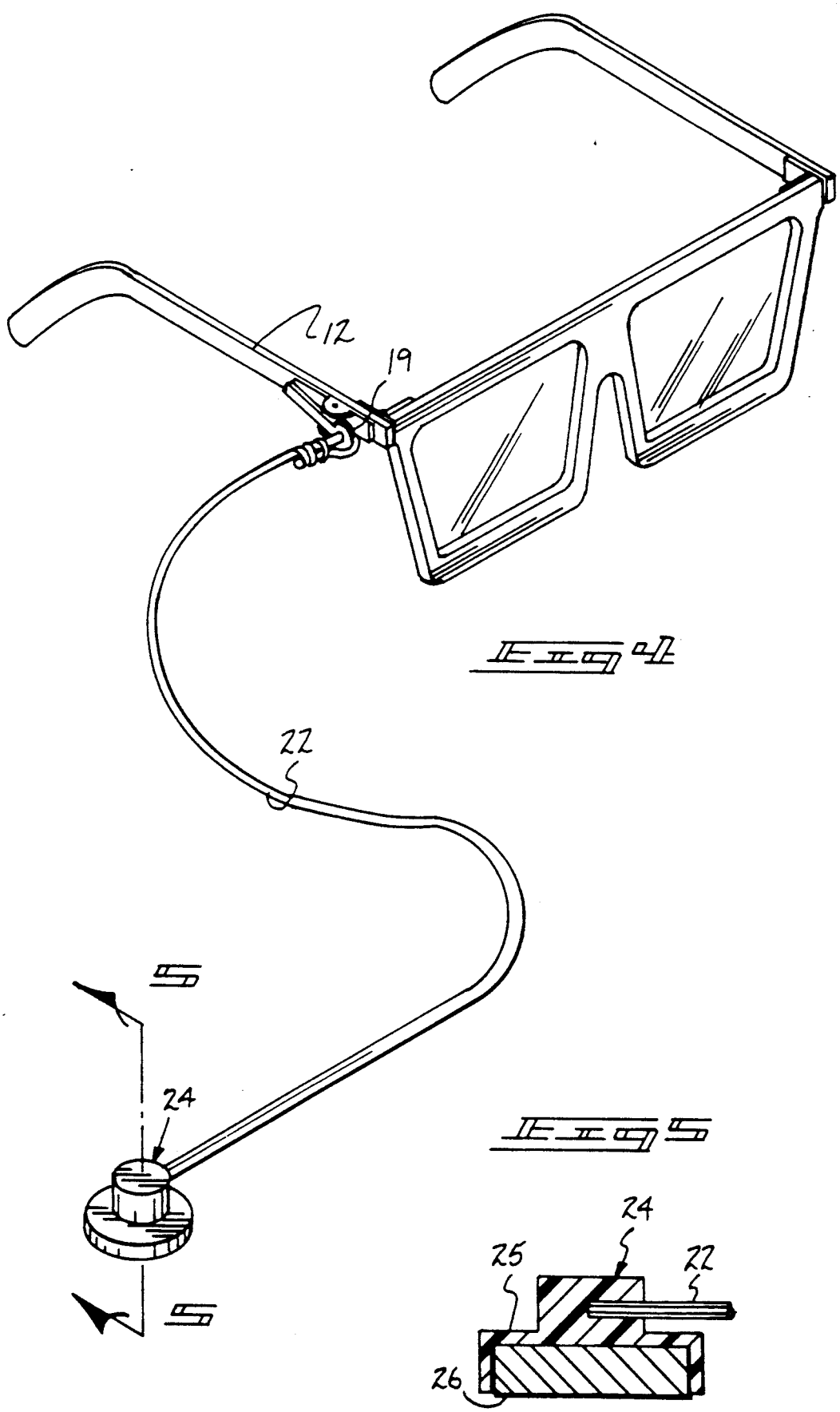

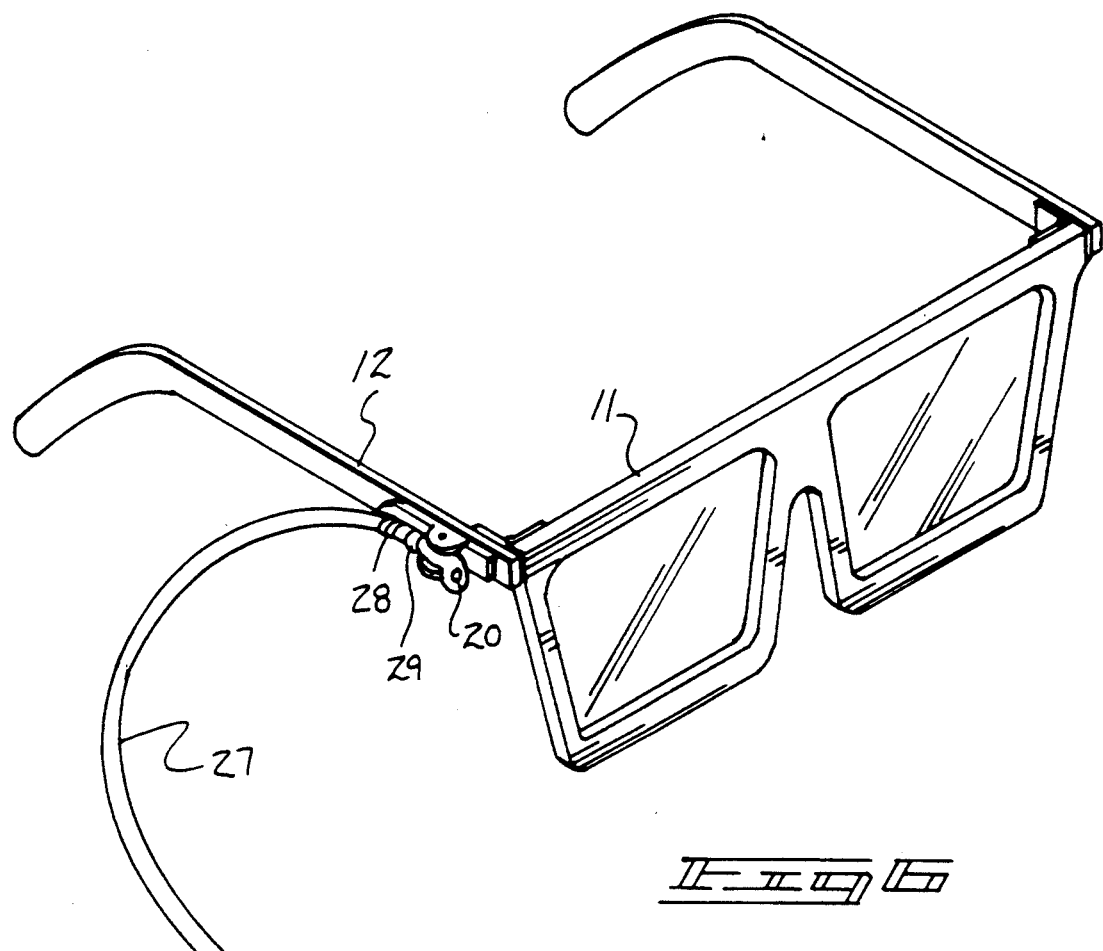
Fig 6
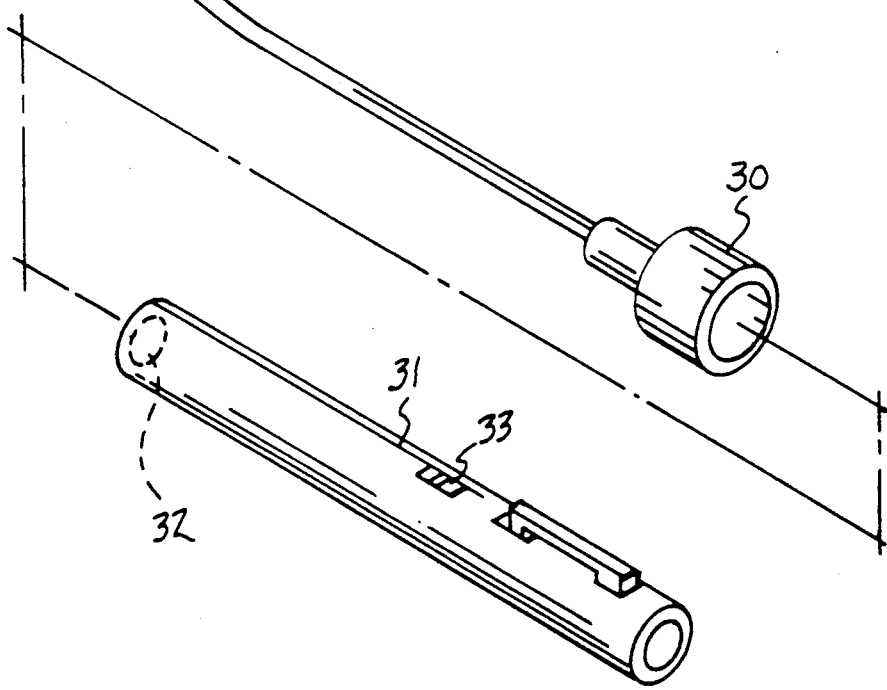

EYEGLASS HOLDER CLIP AND ACCESSORY KIT

BACKGROUND OF THE INVENTION

1. Field of the Invention

The field of invention relates to eyeglass construction, and more particularly pertains to a new and improved eyeglass holder clip and accessory kit for accommodating storage of the eyeglass assembly during periods of non-use.

2. Description of the Prior Art

Various accessory structure is arranged for use in combination with eyeglass members and such is exemplified in the U.S. Pat. No. 4,903,375 having a pocket clip for eyeglasses mounted to a leg portion of an eyeglass assembly.

U.S. Pat. No. 4,496,224 to Allen sets forth an example of an eyeglass member having pocket clips mounted thereto as part of the forward framework of the eyeglass assembly.

Accordingly, it may be appreciated that there continues to be a need for a new and improved eyeglass holder clip and accessory kit as set forth by the instant invention which addresses both the problems of ease of use as well as effectiveness in construction in accommodating storage and accessory mounting of the eyeglass assembly and in this respect, the present invention substantially fulfills this need.

SUMMARY OF THE INVENTION

In view of the foregoing disadvantages inherent in the known types of eyeglass accessory structure now present in the prior art, the present invention provides an eyeglass holder clip and accessory kit wherein the same is arranged for the securement of an eyeglass assembly relative to a pocket structure and the like during periods of non-use of the eyeglass structure. As such, the general purpose of the present invention, which will be described subsequently in greater detail, is to provide a new and improved eyeglass holder clip and accessory kit which has all the advantages of the prior art eyeglass accessory apparatus and none of the disadvantages.

To attain this, the present invention includes an eyeglass framework with a respective first and second folding leg mounted at opposed ends thereof, with at least one leg having a clip member formed with a fixed jaw and movable jaw biased towards the fixed jaw to permit securement of the eyeglass assembly within a pocket structure in a secure relationship during transport and storage of the organization. The invention is further arranged to permit a plurality of tether lines arranged for securement thereto to permit remote mounting of the eyeglass structure. A further cable is arranged of a fiber optic cable construction in operative communication with an illumination member to direct illumination through the fiber optic cable to project illumination forwardly of the eyeglass framework.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved eyeglass holder clip and accessory kit which has all the advantages of the prior art eyeglass accessory apparatus and none of the disadvantages.

It is another object of the present invention to provide a new and improved eyeglass holder clip and accessory kit which may be easily and efficiently manufactured and marketed.

It is a further object of the present invention to provide a new and improved eyeglass holder clip and accessory kit which is of a durable and reliable construction.

An even further object of the present invention is to provide a new and improved eyeglass holder clip and accessory kit which is susceptible of a low cost of manufacture with regard to both materials and labor, and which accordingly is then susceptible of low prices of sale to the consuming public, thereby making such eyeglass holder clip and accessory kits economically available to the buying public.

Still yet another object of the present invention is to provide a new and improved eyeglass holder clip and accessory kit which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG.1 is an isometric illustration of the invention and clip structure.

FIG. 2 is an enlarged isometric illustration of the clip structure mounted to the eyeglass leg.

FIG. 3 is an isometric illustration of a further component of the kit structure.

FIG. 4 is an isometric illustration of a yet further component of the kit structure.

FIG. 5 is an orthographic view, taken along the lines 5—5 of FIG. 4 in the direction indicated by the arrows.

FIG. 6 is an isometric illustration of the kit structure of the invention in use with an illumination fiber optic cable.

DESCRIPTION OF THE PREFERRED EMBODIMENT

With reference now to the drawings, and in particular to FIGS. 1 to 6 thereof, a new and improved eyeglass holder clip and accessory kit embodying the principles and concepts of the present invention and generally designated by the reference numeral 10 will be described.

More specifically, the eyeglass holder clip and accessory kit structure 10 of the invention sets forth an eyeglass frame 11 having eyeglass lenses mounted within the frame, with respective first and second frame legs 12 and 13 pivotally mounted to opposed sides of the frame 11. The first leg 12 includes a mounting plate 14 fixedly secured thereto positioned to an exterior surface of the first leg 12, with the mounting plate having spaced flanges orthogonally mounted to the mounting plate having a second movable jaw 17 pivotally mounted between the spaced flanges of the second movable jaw, including a movable jaw lever plate 19 extending rearwardly of the movable jaw. A first fixed jaw 16 is mounted to a forward distal end of the mounting plate 14 to cooperate with the second movable jaw 17. A spring hinge 18 mounts the second movable jaw 17 within the spaced flanges 15 to bias the second movable jaw 17 towards the fixed jaw 16.

The lever plate 19, such as illustrated in FIG. 6, is formed with an aperture 20 directed therethrough to fixedly receive a respective first or second tether cable 21 and 22 therethrough. The first tether cable 21 includes a first tether cable clip member 23 mounted to a free distal end of the first tether cable 21 spaced from the lever plate 19 to permit securement of the eyeglass assembly to a pocket structure of an individual and the like when the eyeglass structure is worn by the individual. The second tether cable 24 has a second tether cable magnetic anchor member 24 mounted to a free distal end thereof having an anchor housing 25 receiving a ferromagnetic cylinder therewithin for selective securement of the eyeglass structure to a metallic support surface in lieu of the clip structure of the first and second movable jaws 16 and 17 mounted to the first frame leg 12.

The FIG. 6 illustrates the organization 10 further including a third tether cable 27 having a cable loop 28 mounted adjacent a first end 29 thereof. The cable loop 28 is arranged for reception between the fixedly movable jaws 16 and 17 to align and project the first end 29 forwardly towards the frame 11 longitudinally aligned relative to the first frame leg 12. A resilient socket 30 is formed at a second end of the third cable to receive a tubular flashlight 31, and more specifically the flashlight lens 32 therewithin, wherein an on/off switch 33 of the flashlight 31 directs illumination through the cable 27 and projects illumination through the third cable first end 29 to provide for illumination for use in cooperation with the eyeglass assembly.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An eyeglass holder clip and accessory kit, comprising, an eyeglass frame, the eyeglass frame including spaced lenses mounted therewithin, and a first frame leg and a second frame leg pivotally mounted to opposed sides of the eyeglass frame, the first frame leg having a mounting plate fixedly secured thereto, the mounting plate including spaced flanges orthogonally and integrally mounted to the mounting plate projecting exteriorly of the first frame leg, with the mounting plate including a first fixed jaw at a forward distal end of the mounting plate, a second movable jaw having a spring hinge securing the second movable jaw between the mounting plates, with the second movable jaw biased towards the first fixed jaw by the spring hinge, and the second movable jaw including a movable jaw lever plate projecting rearwardly of the second movable jaw, and the lever plate includes an aperture directed therethrough, and a first tether cable and second tether cable are arranged for selective securement through the aperture, the first tether cable including a first clip member mounted fixedly secured to the first tether cable at a remote distal end of the first tether cable spaced from the aperture, and the second tether cable including a second tether cable magnetic anchor member mounted to the second tether cable at a remote distal end of the second tether cable.

2. An eyeglass kit as set forth in claim 1 wherein the anchor member includes an anchor housing, the anchor housing having a ferromagnetic cylinder positioned fixedly therewithin.

3. An eyeglass kit as set forth in claim 2 including a third tether cable, the third tether cable having a third tether cable first end, and a cable loop secured about the third tether cable spaced from the third tether cable first end, with the cable loop arranged for reception between the first fixed jaw and the second movable jaw, and the third cable first end projecting towards the eyeglass frame along the first frame leg, and the third tether cable having a third tether cable second end spaced from the third cable first end, with the third cable second end including a resilient socket secured thereabout, and a tubular flashlight arranged for reception within the resilient socket to direct illumination into the third cable second end and to direct illumination through the third tether cable, wherein the third tether cable is formed as a fiber optic cable for transmission of illumination therethrough.

* * * * *